United States Patent
Kim et al.

(10) Patent No.: US 12,537,236 B2
(45) Date of Patent: Jan. 27, 2026

(54) ATMOSPHERIC SHIELDING TYPE IN-SITU ANALYSIS DEVICE FOR CROSS-SECTION OF BATTERY CELL AND IN-SITU ANALYSIS METHOD USING THE SAME

(71) Applicants: Hyundai Motor Company, Seoul (KR); Kia Corporation, Seoul (KR); Korea Institute of Science and Technology, Seoul (KR)

(72) Inventors: Yun Sung Kim, Gyeonggi-do (KR); Tae Hoon Hwang, Gyeonggi-do (KR); Seung Ho Choi, Gyeonggi-Do (KR); Ga Hyeon Im, Gyeonggi-do (KR); Jae Pyoung Ahn, Seoul (KR); Hae Ryoung Kim, Seoul (KR); Hyun Jeong Lee, Seoul (KR)

(73) Assignees: Hyundai Motor Company, Seoul (KR); Kia Corporation, Seoul (KR); Korea Institute of Science and Technology, Seoul (KR)

( * ) Notice: Subject to any disclaimer, the term of this patent is extended or adjusted under 35 U.S.C. 154(b) by 654 days.

(21) Appl. No.: 18/072,066

(22) Filed: Nov. 30, 2022

(65) Prior Publication Data

US 2024/0047771 A1    Feb. 8, 2024

(30) Foreign Application Priority Data

Aug. 3, 2022    (KR) .................. 10-2022-0096708

(51) Int. Cl.
*H01M 10/42*    (2006.01)
*H01M 10/44*    (2006.01)

(52) U.S. Cl.
CPC ....... *H01M 10/4285* (2013.01); *H01M 10/44* (2013.01)

(58) Field of Classification Search
None
See application file for complete search history.

(56) References Cited

U.S. PATENT DOCUMENTS

2016/0236192 A1    8/2016    Yan et al.

FOREIGN PATENT DOCUMENTS

| CN | 111279191 A | * | 6/2020 | .......... H01M 10/486 |
| KR | 20180062839 A | * | 6/2018 | ............ H01M 10/04 |
| KR | 102077725 B1 | | 2/2020 | |
| KR | 20220029338 A | * | 3/2022 | ......... G01R 31/3865 |
| WO | WO-2021153842 A1 | * | 8/2021 | ........ H01M 10/0481 |
| WO | WO-2023222454 A1 | * | 11/2023 | ............ H02J 7/0042 |

* cited by examiner

*Primary Examiner* — Stephanie E Bloss
*Assistant Examiner* — Diana Hancock
(74) *Attorney, Agent, or Firm* — Fox Rothschild LLP

(57) ABSTRACT

Disclosed is an atmospheric shielding type analysis device for a cross-section of a battery cell and an analysis method using the same. The device comprises 1) a body member comprising a bottom plate, a side wall, and an inner space partitioned by the bottom plate and the side wall; 2) a cover member; 3) a first conductive wire member penetrating one side wall of the body member; 4) a first mounting member comprising a first substrate having a shape of a plate and being coupled to an end of the first conductive wire member; 5) a second conductive wire member penetrating another side wall of the body member; 6) a second mounting member comprising a second substrate having a shape of a plate and being coupled to an end of the second conductive wire member; 7) a gas inlet; and 8) a gas outlet.

20 Claims, 6 Drawing Sheets

ATMOSPHERIC SHIELDING TYPE IN-SITU ANALYSIS DEVICE FOR CROSS-SECTION OF BATTERY CELL AND IN-SITU ANALYSIS METHOD USING THE SAME

CROSS-REFERENCE TO RELATED APPLICATION

This application claims, under 35 U.S.C. § 119(a), the benefit of Korean Patent Application No. 10-2022-0096708, filed on Aug. 3, 2022, the entire contents of which are incorporated herein by reference.

BACKGROUND

Technical Field

The present disclosure relates to an atmospheric shielding type in-situ analysis device for a cross-section of a battery cell and an in-situ analysis method using the same.

Background

Globally, as concerns about future oil price rise increase, and fuel economy regulations are strengthened to solve environmental problems caused by automobile exhaust gas, efforts are underway to prepare for this situation. As part of these efforts, attentions are focused on a secondary battery, which is one of the energy storage devices, and development thereof is actively underway. Unlike a primary battery, a secondary battery is repeatedly charged and discharged, and thus is adopted in a portable electronic device such as a cellular phone, a laptop computer, and a camcorder, providing great convenience. A secondary battery has been developed in various types such as a nickel-cadmium battery, a nickel-metal hydride battery, a nickel-hydrogen battery, and a lithium secondary battery. In particular, the lithium secondary battery is attracting the most attention because of the excellent operating voltage characteristics and energy density per unit weight characteristics thereof compared to the nickel-cadmium battery or the nickel-metal hydride battery, which is widely used as a power source for electronic devices.

Recently, in order to increase the size of a secondary battery used in an electric vehicle and an energy storage system (ESS), development of a secondary battery having excellent electrochemical properties such as high capacity and high output is required. For this reason, along with research on material development that transforms or forms complexes with existing materials, analysis on developed materials, and analysis on reaction and degradation systems are being actively conducted. Recent analysis research has a tendency to introduce an in-situ method beyond an ex-situ method of chemical analysis. Due to the introduction of an in-situ method that enables analysis while charging and discharging a secondary battery, it is possible to measure data practically and accurately. Various in-situ analysis methods such as in-situ XAS (X-ray absorption spectroscopy), in-situ XRD (X-ray diffractometry), and in-situ Raman have been developed so far, and converting various analysis methods such as SEM (scanning electron microscopy) and TEM (transmission electron microscopy) into in-situ methods is being actively carried out.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide an in-situ analysis device capable of shielding a battery cell, which is to be analyzed, from the atmosphere and keeping the humidity inside the analysis device low to prevent side reactions from occurring in the battery cell, and an in-situ analysis method using the same.

An object of the present disclosure is to provide an in-situ analysis device capable of loading a battery cell in a direction, the direction in which the battery cell is stacked, parallel to the ground so as to analyze the interface thereof in real time during charging and discharging of the battery cell, and an in-situ analysis method using the same.

Another object of the present disclosure is to provide an in-situ analysis device capable of analyzing the cross section of the battery cell while adjusting the pressure applied thereto, and an in-situ analysis method using the same.

The objects of the present disclosure are not limited to the objects mentioned above. The objects of the present disclosure will become more apparent from the following description, and will be realized by ways and combinations thereof described in the claims.

In one aspect, the present disclosure may provide an atmospheric shielding type analysis device for a cross section of a battery cell including a body member including a bottom plate, a side wall located at a side end of the bottom plate, and an inner space partitioned by the bottom plate and the side wall, a cover member coupled to the upper part of the body member, a first conductive wire member penetrating one side wall of the body member and being partially inserted into the inner space, a first mounting member including a first substrate having a shape of a plate and being coupled to an end of the first conductive wire member to support one surface of the battery cell, a second conductive wire member penetrating another side wall of the body member and being partially inserted into the inner space, a second mounting member including a second substrate having a shape of a plate and being coupled to an end of the second conductive wire member to support another surface of the battery cell, a gas inlet formed through one side portion of one side wall of the body member and configured to provide gas into the inner space, and a gas outlet formed through one side portion of another side wall of the body member and configured to discharge the gas in the inner space to the outside.

In some embodiments, the first substrate and the second substrate each have a predetermined area.

In some embodiments, the gas inlet and the gas outlet are on opposite side walls of the body member.

In a preferred embodiment, the body member may include a seating member protruding from the side wall to the inner space, and the seating member may have an upper surface to which the cover member is coupled.

In another preferred embodiment, the device may further include a sealing member interposed between the side wall of the body member and the cover member.

In still another preferred embodiment, the cover member may include a transparent material.

In yet another preferred embodiment, the body member may include a first through hole formed through one side wall with a diameter wider than a diameter of the first conductive wire member, the first conductive wire member may be inserted into the inner space through the first through hole, and the first through hole and the first conductive wire member may have a space therebetween into which a first support member is inserted.

In still yet another preferred embodiment, the first conductive wire member may be coupled to the first support member by screw threads.

In a further preferred embodiment, the first support member may be coupled to the first through hole by screw threads.

In another further preferred embodiment, the device may further include a sealing member interposed between the first support member and the first through hole.

In still another further preferred embodiment, the body member may include a second through hole formed through another side wall with a diameter wider than a diameter of the second conductive wire member, the second conductive wire member may be inserted into the inner space through the second through hole, and the second through hole and the second conductive wire member may have a space therebetween into which a second support member is inserted.

In yet another further preferred embodiment, the second conductive wire member may be coupled to the second support member by screw threads.

In still yet another further preferred embodiment, the second support member may be coupled to the second through hole by screw threads.

In a still further preferred embodiment, the device may further include a sealing member interposed between the second support member and the second through hole.

In a yet still further preferred embodiment, the first substrate may have one surface connected to one end of the first conductive wire member, the first mounting member may further include a first current collecting member disposed on another surface of the first substrate. The first current collecting member may have the same or smaller area than the first substrate and allow current and electrons to move between the first conductive wire member and the battery cell, and wherein the first current collecting member may be brought into contact with the battery cell.

In a yet still further preferred embodiment, the second mounting member may include a disk plate having a predetermined area and thickness and having one surface connected to the second conductive wire member, the second substrate disposed on another surface of the disk plate, an elastic member interposed between the disk plate and the second substrate to elastically support the second substrate, and a second current collecting member disposed on another surface of the second substrate and having the same or smaller area than the second substrate to allow current and electrons to move between the second conductive wire member and the battery cell.

In another aspect, the second mounting member may include a load cell connected with the second conductive wire member by screw threads, the second substrate connected to the load cell, an elastic member interposed between the load cell and the second substrate to elastically support the second substrate, and a second current collecting member disposed on another surface of the second substrate and having the same or smaller area than the second substrate to allow current and electrons to move between the second conductive wire member and the battery cell. Here, the second mounting member may adjust the load applied to the battery cell by regulating the screw threads of the second conductive wire member and the load cell.

In still another aspect, the second mounting member may include a disk plate having a predetermined area and thickness and having one surface connected to the second conductive wire member, the second substrate disposed on another surface of the disk plate, a ball member protruding from another surface of the disk plate so as to locally press the second substrate, an elastic member interposed between the disk plate and the second substrate to elastically support the second substrate, and a second current collecting member disposed on another surface of the second substrate and having the same or smaller area than the second substrate to allow current and electrons to move between the second conductive wire member and the battery cell. In a further aspect, the present disclosure may provide a method of analyzing a cross-section of a battery cell including loading the battery cell including a positive electrode layer, an electrolyte layer, and a negative electrode layer which are stacked in this order between the first mounting member and the second mounting member with the cross section of the battery cell facing the cover member, allowing gas introduced into the inner space through the gas inlet to be discharged through the gas outlet to create a flow of gas, supplying a current to the battery cell through the first conductive wire member and the second conductive wire member to charge and discharge the battery cell, and analyzing the cross section of the battery cell using an analyzer located above the cover member.

In a preferred embodiment, the method may further include adjusting a degree of insertion of the second conductive wire member so as to adjust the pressure applied to the battery cell to a desired level, then charging and discharging the battery cell.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

In FIG. 5, the second mounting member is illustrated in a first embodiment;

Figure 1:
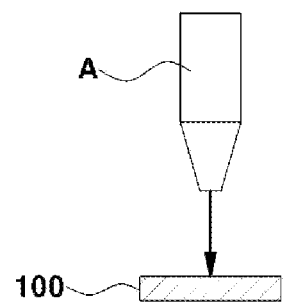
FIG. 1 shows a method of using an atmospheric shielding type analysis device for a cross section of a battery cell according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

The above and other objects, features, and advantages of the present disclosure will become more readily apparent from the following description of preferred embodiments with reference to the accompanying drawings. However, the present disclosure is not limited to the embodiments described herein but may be embodied in other forms. Rather, the embodiments disclosed herein are provided so that this disclosure will be thorough and complete, and will fully convey the concept of the disclosure to those skilled in the art.

Like reference numerals are used for like elements in describing each drawing. In the accompanying drawings, the dimensions of the structures are shown enlarged from the actual for the sake of clarity of the present disclosure. It will be understood that, although the terms "first", "second", etc. may be used herein to describe various elements, these elements should not be limited by these terms. These terms are generally only used to distinguish one element from another. For example, without departing from the scope of the present disclosure, a first component may be referred to as a second component, and similarly, a second component may also be referred to as a first component. A singular representation may include a plural representation unless it represents a definitely different meaning from the context.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Terms such as "include" or "has" are used herein and it should be understood that the terms are intended to indicate the existence of several components, functions or steps, disclosed in the specification, and it is also to be understood that greater or fewer components, functions, or steps may likewise be utilized. Also, where a portion such as a layer, film, region, plate, or the like is referred to as being "on" another portion, this includes not only the case where it is "directly on" another portion, but also the case where there is another portion in between. Conversely, when a portion such as a layer, film, region, plate or the like is referred to as being "under" another portion, this includes not only the case where it is "directly underneath" another portion, but also the case where there is another portion in between.

Unless otherwise specified, all numbers, values, and/or expressions expressing the amount of components, reaction conditions, polymer compositions, and formulations used herein are approximations inherently reflective of various uncertainties in the measurements that result in obtaining theses values among others, and thus are to be understood as being modified by the term "about" in all cases. In addition, when a numerical range is disclosed in this description, the range is continuous, and includes all values from the minimum value to the maximum value of the range, unless otherwise indicated. Further, when such a range refers to an integer, all integers including the minimum value to the maximum value including the maximum value are included unless otherwise indicated.

FIG. 1 shows a method of using an atmospheric shielding type analysis device for a cross section of a battery cell according to the present disclosure. The battery cell may be provided inside the analysis device 100, and may be observed and analyzed with an analyzer A installed outside the analysis device 100.

The analyzer A is not particularly limited, but may include, for example, an optical microscope, a Raman spectrum analyzer, and the like.

Figure 2:
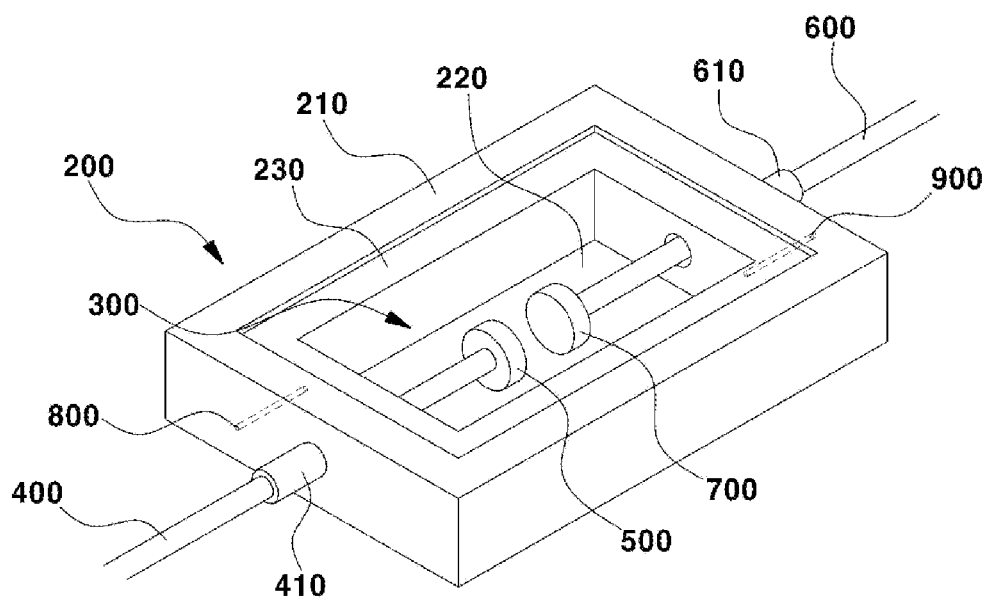
FIG. 2 shows a perspective view of the analysis device according to the present disclosure.
Figure 3:
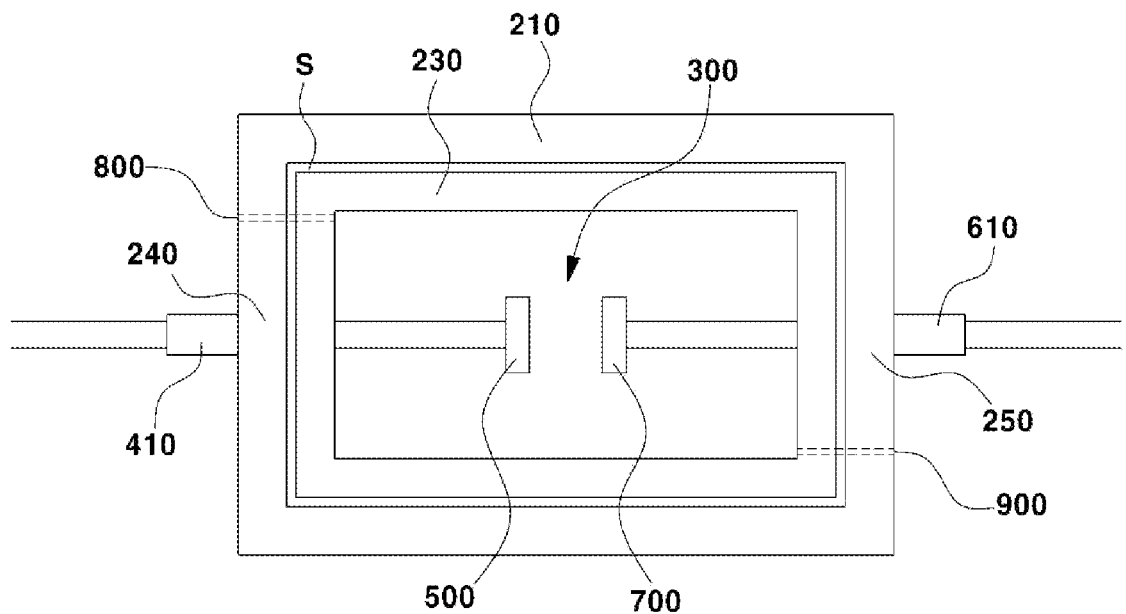
FIG. 3 shows a plan view of the analysis device according to the present disclosure.
Figure 4:
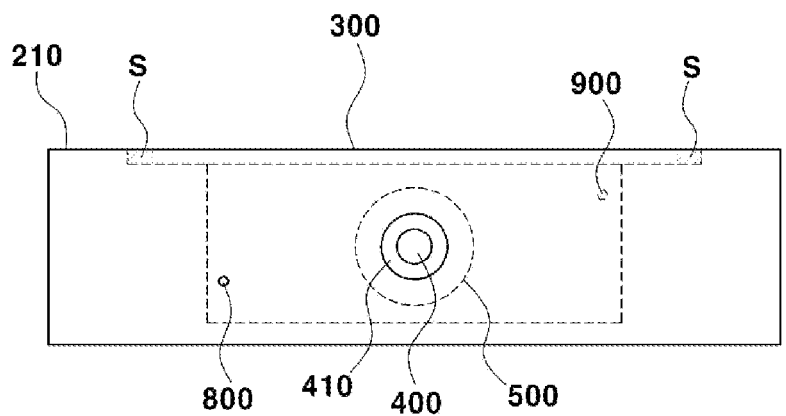
FIG. 4 shows a side view of the analysis device according to the present disclosure.

FIGS. 2 to 4 shows the analysis device 100 according to the present disclosure. FIG. 2 shows a perspective view of the analysis device 100, FIG. 3 shows a plan view of the analysis device 100, and FIG. 4 shows a side view of the analysis device 100. Hereinafter, the analysis device 100 will be described in detail with reference to FIGS. 2 to 4.

The analysis device 100 may include a body member 200 including a bottom plate 220, a side wall 210 located at a side end of the bottom plate 220, and an inner space partitioned by the bottom plate 220 and the side wall 210.

The body member 200 may include a seating member 230 protruding from the side wall 210 into the inner space. The seating member 230 may have an upper surface to which a cover member 300 is coupled.

The cover member 300 may block the inner space from outside. To prevent external air from being introduced into the inner space, a sealing member S may be inserted between the cover member 300 and the side wall 210.

The cover member 300 may be include a transparent material so that the battery cell provided in the inner space may be observed and analyzed. For example, the cover member 300 may include a transparent glass cover.

The analysis device 100 may include a first conductive wire member 400 penetrating one side wall of the body member 200 and being partially inserted into the inner space.

The first conductive wire member 400 may provide current and/or voltage needed in charging and discharging the battery cell, and may include a conductive material. Specifically, the first conductive wire member 400 may include a conductive metal, and may have rigidity sufficient to maintain the shape thereof even when a predetermined pressure is applied.

Hereinafter, the connection relationship between the first conductive wire member 400 and the body member 200 will be described in detail.

The body member 200 may include a first through hole 240 formed through one side wall with a diameter wider than a diameter of the first conductive wire member 400. The first conductive wire member 400 may be inserted into the inner space through the first through hole 240.

The first through hole 240 and the first conductive wire member 400 have a space therebetween into which a first support member 410 is inserted.

The first conductive wire member 400 may be coupled to the first support member 410 by screw threads. Specifically, a screw thread formed on the outer surface of the first conductive wire member 400 and a screw thread formed on the inner surface of the first support member 410 may engage with each other.

In addition, the first support member 410 may be coupled to the first through hole 240 by screw threads. Specifically, a screw thread formed on all or part of the outer surface of the first support member 410 and a screw thread formed on all or part of the inner surface of the first through hole 240 may engage with each other.

Between the first support member 410 and the first through hole 240, a sealing member (not shown) may be inserted therebetween to seal the inner space from the outside.

The analysis device 100 may include a second conductive wire member 600 penetrating another side wall of the body member 200 and being partially inserted into the inner space.

The second conductive wire member 600 may provide current and/or voltage needed in charging and discharging the battery cell, and may include a conductive material. Specifically, the second conductive wire member 600 may include a conductive metal, and may have rigidity sufficient to maintain its shape even when a predetermined pressure is applied.

Hereinafter, the connection relationship between the second conductive wire member 600 and the body member 200 will be described in detail.

The body member 200 may include a second through hole 250 formed through another side wall with a diameter wider than a diameter of the second conductive wire member 600. The second conductive wire member 600 is inserted into the inner space through the second through hole 250.

The second through hole 250 and the second conductive wire member 600 may have a space therebetween into which a second support member 610 is inserted.

The second conductive wire member 600 may be coupled to the second support member 610 by screw threads. Specifically, a screw thread formed on the outer surface of the second conductive wire member 600 and a screw thread formed on the inner surface of the second support member 610 may engage with each other.

In addition, the second support member 610 may be coupled to the second through hole 250 by screw threads. Specifically, a screw thread formed on all or part of the outer surface of the second support member 610 and a screw thread formed on all or part of the inner surface of the second through hole 250 may engage with each other.

Between the second support member 610 and the second through hole 250, a sealing member (not shown) may be inserted to seal the inner space from the outside.

The first conductive wire member 400 and the second conductive wire member 600 may be installed to have the same central axis. The battery cell may be installed between the first conductive wire member 400 and the second conductive wire member 600, and a predetermined pressure is applied to the battery cell. Here, when the central axis of the first conductive wire member 400 and the central axis of the second conductive wire member 600 are not placed on the same line, the battery cell may not be properly loaded or pressure may be unevenly applied to the battery cell.

The analysis device 100 may include a first mounting member 500 including a first substrate having a shape of a plate and a predetermined area. The first mounting member 500 may be coupled to an end of the first conductive wire member 400 to support one surface of the battery cell.

The analysis device 100 may include a second mounting member 700 including a second substrate having a shape of a plate and a predetermined area. The second mounting member 700 may be coupled to an end of the second conductive wire member 600 to support another surface of the battery cell.

The battery cell may be loaded between the first mounting member 500 and the second mounting member 700.

Figure 5:
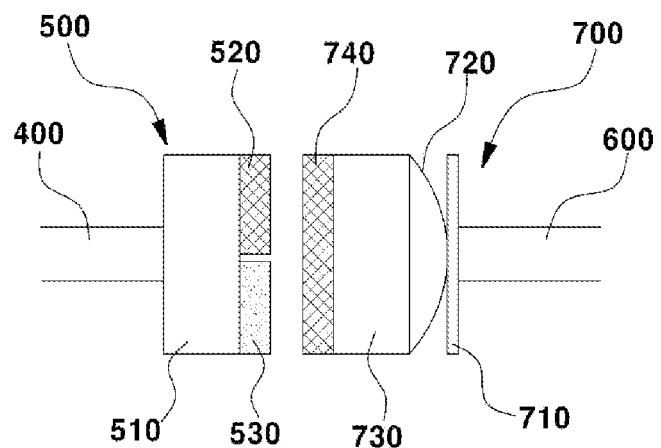
FIG. 5 shows a first mounting member and a second mounting member of the analysis device.
Figure 6:
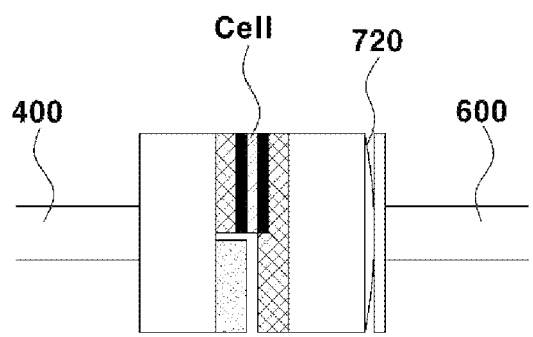
FIG. 6 shows a battery cell loaded between the first mounting member and the second mounting member.

FIG. 5 shows the first mounting member 500 and the second mounting member 700. In FIG. 5, the second mounting member 700 is illustrated in a first embodiment. FIG. 6 shows a battery cell loaded between the first mounting member 500 and the second mounting member 700.

The first substrate 510 may have one surface connected to one end of the first conductive wire member 400. A method of connecting the first substrate 510 with the first conductive wire member 400 is not particularly limited. The first substrate 510 may be connected with the first conductive wire member 400 by welding, thread screwing, or the like.

The first mounting member 500 may further include a first current collecting member 520 disposed on another surface of the first substrate 510 and having the same or smaller area than the first substrate 510.

The first current collecting member 520 may be brought into direct contact with the battery cell so as to apply the current and/or voltage provided from the first conductive wire member 400 to the battery cell and collect electrons generated from the battery cell.

The first current collecting member 520 may include a platinum mesh (Pt mesh) or the like. As described above, because the first current collecting member 520 is brought into direct contact with the battery cell, more stable current collection is possible.

Figure 7:
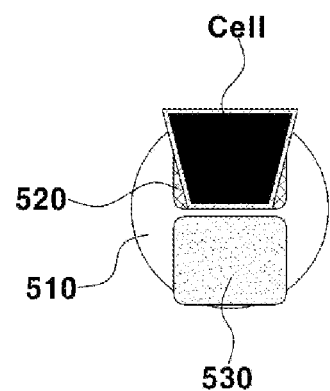
FIG. 7 shows a battery cell having a smaller area than that of the first mounting member is loaded.

FIG. 7 shows a battery cell having a smaller area than that of the first substrate 510 is loaded. The first substrate 510 has installed thereon a first current collecting member 520 having an area equal to that of the battery cell, and has installed thereon a spacer 530 on the remaining area of the first substrate 510.

Figure 8:
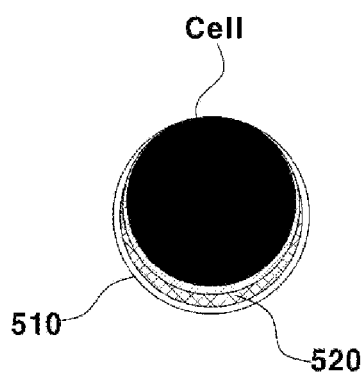
FIG. 8 shows a battery cell having an area equal to that of the first mounting member is loaded.

FIG. 8 shows a battery cell having an area equal to that of the first substrate 510 is loaded. The first substrate 510 has installed thereon a first current collecting member 520 having an area equal to that of the battery cell, and the battery cell is loaded thereon. The battery cell may have a structure in which a positive electrode layer, an electrolyte layer, and a negative electrode layer are stacked in this order. The positive electrode layer and the negative electrode layer may be brought into contact with the first current collecting member 520 and a second current collecting member 740, and the electrolyte layer is provided therebetween.

Because the analysis device 100 is configured to analyze the cross section of the battery cell, the battery cell may be loaded between the first mounting member 500 and the second mounting member 700 with the cross section thereof facing the cover member 300.

When the battery cell is viewed in the same direction as in FIGS. 7 and 8, it may be preferable to load the battery cell to contact the uppermost end of the first substrate 510 as much as possible. This serves to enable the analyzer A to observe and analyze the cross section of the battery cell more easily.

Hereinafter, a first embodiment of the second mounting member 700 will be described with reference to FIGS. 5 and 6.

The second mounting member 700 may include a disk plate 710 having a predetermined area and thickness and having one surface connected to the second conductive wire member 600, a second substrate 730 disposed on another surface of the disk plate 710 and having a predetermined area, an elastic member 720 provided between the disk plate 710 and the second substrate 730 to elastically support the second substrate 730, and a second current collecting member 740 disposed on another surface of the second substrate 730 and having the same or smaller area than the second substrate 730.

The second current collecting member 740 may be brought into direct contact with the battery cell so as to apply the current and/or voltage provided from the second conductive wire member 600 to the battery cell and collect electrons generated from the battery cell.

As illustrated in FIGS. 7 and 8, after the battery cell is loaded on the first mounting member 500, a predetermined load or pressure may be applied to the battery cell while fixing the battery cell using the second mounting member 700. Specifically, the second conductive wire member 600 may be inserted until the elastic member 720 is completely compressed as illustrated in FIG. 6 so as to fix the battery cell. Here, because a load corresponding to the spring constant of the elastic member 720 is applied to the battery cell, it is important to completely compress the elastic member 720 in order to set the same load conditions during analysis.

Figure 9:
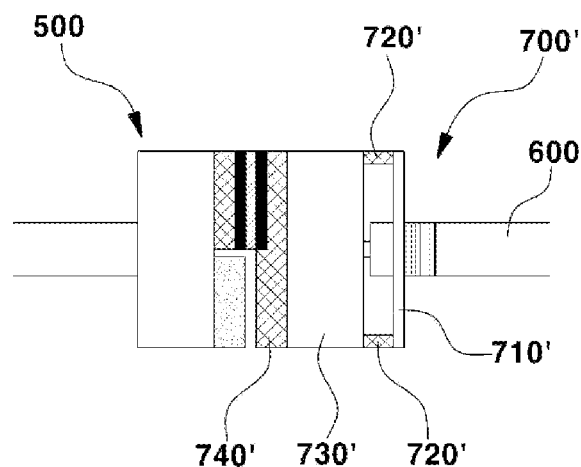
FIG. 9 shows a second embodiment of the second mounting member.

FIG. 9 shows a second embodiment of the second mounting member 700'. The second mounting member 700' may include a load cell 710' connected with the second conductive wire member 600 by screw threads, a second substrate 730' connected to the load cell 710' and having a predetermined area, an elastic member 720' provided between the load cell 710' and the second substrate 730' to elastically support the second substrate 730', and a second current collecting member 740' located on another surface of the second substrate 730'.

The load cell 710' may refer to a conventional load cell device used to measure pressure. The load cell 710' may be connected to the second conductive wire member 600 by screw threads. In the second embodiment of FIG. 9, a degree of insertion of the second conductive wire member 600 or a degree of connection between the load cell 710' and the second conductive wire member 600 may be adjusted using a screw thread so as to apply a desired load or pressure to the battery cell.

Figure 10:
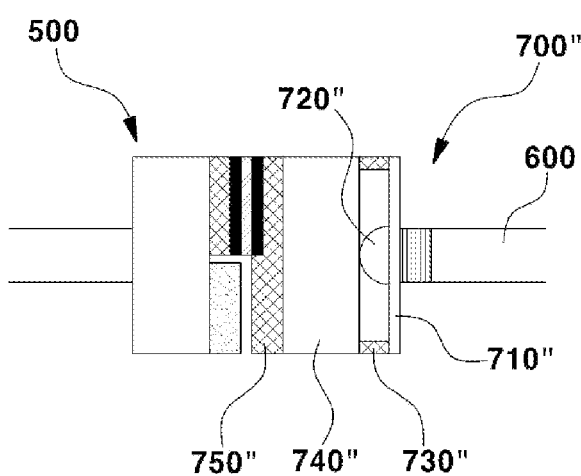
FIG. 10 shows a third embodiment of the second mounting member.

FIG. 10 shows a third embodiment of the second mounting member 700". The second mounting member 700" may include a disk plate 710" having a predetermined area and thickness and having one surface connected to the second conductive wire member 600, a second substrate 740" disposed on another surface of the disk plate 710" and having a predetermined area, a ball member 720" protruding from another surface of the disk plate 710" so as to locally press the second substrate 740", an elastic member 730" provided between the disk plate 710" and the second substrate 740" to elastically support the second substrate 740", and a second current collecting member 750" located on another surface of the second substrate 740".

In the third embodiment of the second mounting member 700", a torque wrench (not shown) may be installed to penetrate the inside of the second conductive wire member 600, and the torque wrench may press the ball member 720" to apply a desired load or pressure to the battery cell.

Because the analysis device 100 according to the present disclosure may adjust the pressure applied to the battery cell, the charging and discharging behavior depending on the pressure applied to the battery cell may be observed and analyzed.

The analysis device 100 may include a gas inlet 800 formed through one side wall of the body member 200 to provide gas to the inner space and a gas outlet 900 formed through the other side wall of the body member 200 to discharge the gas in the inner space to the outside.

The gas may include an inert gas such as argon gas.

The humidity in the inner space of the analysis device 100 may be maintained very low by continuously introducing gas through the gas inlet 800 and creating a flow continuously discharged through the gas outlet 900.

Meanwhile, the gas inlet 800 and the gas outlet 900 may be positioned on surfaces facing each other. Therefore, the battery cell may be more easily exposed to the newly exchanged inert gas. In addition, in order to better implement the above purpose, when the gas inlet 800 is located at one side portion of the one side wall, the gas outlet 900 is located at another side portion of the other side wall so as to be staggered from each other. In some embodiments, the gas inlet 800 and the gas outlet 900 are on opposite side walls of the body member 200.

Because the analysis device 100 according to the present disclosure has an inner space isolated from the outside using a sealing member and having very low humidity, the analysis device 100 may charge and discharge the battery cell without side reactions, and may proceed with observation and analysis even when the battery cell contains a material vulnerable to air and/or moisture.

Figure 11:
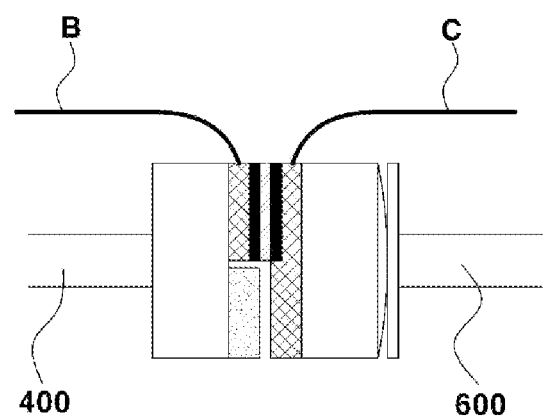
FIG. 11 shows another embodiment of the analysis device according to the present disclosure.

FIG. 11 shows another embodiment of the analysis device 100. For convenience of explanation, FIG. 11 shows a local configuration in which a battery cell is loaded. The analysis device 100 may further include additional conductive wires B and C connected to the current collecting member. Specifically, the first conductive wire member 400 and the second conductive wire member 600 are specified for current and the additional conductive wires B and C are specified for voltage to thereby charge and discharge the battery cell. This may reduce distortion caused by resistance contribution from outside the cell to obtain more accurate results.

The additional conductive wires B and C may be inserted into the inner space of the body in the same structure as the above-described first conductive wire member 400 and second conductive wire member 600.

An analysis method using the analysis device according to the present disclosure may include loading a battery cell between the first mounting member 500 and the second mounting member 700 with the cross section of the battery cell facing the cover member 300, allowing gas introduced into the inner space through the gas inlet 800 to be discharged through the gas outlet 900 so as to create a flow of gas, supplying a current to the battery cell through the first conductive wire member 400 and the second conductive wire member 600 so as to charge and discharge the battery cell, and analyzing the cross section of the battery cell using an analyzer A located above the cover member 300.

As is apparent from the above description, the present disclosure provides the following effects.

According to the present disclosure, a battery cell to be analyzed is shielded from the atmosphere and the humidity inside an analysis device is kept low, thereby preventing occurrence of side reactions in the battery cell.

According to the present disclosure, a battery cell may be loaded in a direction, the direction in which the battery cell is stacked, parallel to the ground, thereby analyzing the interface thereof in real time during charging and discharging of the battery cell.

According to the present disclosure, the cross section of a battery cell may be analyzed while adjusting the pressure applied thereto.

The effects obtained by the present disclosure are not limited to the effects mentioned above. It should be understood that the effects of the present disclosure include all effects that can be inferred from the above description.

Although the present disclosure has been described in detail with reference to the embodiments, the embodiments are provided to describe the present disclosure in detail, the present disclosure is not limited thereto, and the present disclosure can be modified or improved by a person having ordinary skill in the art to which the preset disclosure pertains within the technical idea of the disclosure.

What is claimed is:

1. An atmospheric shielding type analysis device for a cross section of a battery cell, comprising:
   a body member comprising a bottom plate, a side wall located at a side end of the bottom plate, and an inner space partitioned by the bottom plate and the side wall;
   a cover member coupled to an upper part of the body member;
   a first conductive wire member penetrating one side wall of the body member and being partially inserted into the inner space;
   a first mounting member comprising a first substrate having a shape of a plate and being coupled to an end of the first conductive wire member to support one surface of the battery cell;
   a second conductive wire member penetrating another side wall of the body member and being partially inserted into the inner space;
   a second mounting member comprising a second substrate having a shape of a plate and being coupled to an end of the second conductive wire member to support another surface of the battery cell;
   a gas inlet formed through one side portion of one side wall of the body member and configured to provide gas into the inner space; and
   a gas outlet formed through one side portion of another side wall of the body member, and configured to discharge the gas in the inner space to the outside.

2. The atmospheric shielding type analysis device according to claim 1, wherein the body member comprises a seating member protruding from the side wall to the inner space, and
   the seating member has an upper surface to which the cover member is coupled.

3. The atmospheric shielding type analysis device according to claim 1, wherein atmospheric shielding type analysis device further comprises a sealing member interposed between the side wall of the body member and the cover member.

4. The atmospheric shielding type analysis device according to claim 1, wherein the cover member comprises a transparent material.

5. The atmospheric shielding type analysis device according to claim 1, wherein the body member comprises a first through hole formed through one side wall with a diameter wider than a diameter of the first conductive wire member,
   the first conductive wire member is inserted into the inner space through the first through hole, and
   the first through hole and the first conductive wire member have a space therebetween into which a first support member is inserted.

6. The atmospheric shielding type analysis device according to claim 5, wherein the first conductive wire member is coupled to the first support member by screw threads.

7. The atmospheric shielding type analysis device according to claim 5, wherein the first support member is coupled to the first through hole by screw threads.

8. The atmospheric shielding type analysis device according to claim 5, wherein the atmospheric shielding type analysis device further comprises a sealing member interposed between the first support member and the first through hole.

9. The atmospheric shielding type analysis device according to claim 1, wherein the body member comprises a second through hole formed through another side wall with a diameter wider than a diameter of the second conductive wire member,
   the second conductive wire member is inserted into the inner space through the second through hole, and
   the second through hole and the second conductive wire member have a space therebetween into which a second support member is inserted.

10. The atmospheric shielding type analysis device according to claim 9, wherein the second conductive wire member is coupled to the second support member by screw threads.

11. The atmospheric shielding type analysis device according to claim 9, wherein the second support member is coupled to the second through hole by screw threads.

12. The atmospheric shielding type analysis device according to claim 9, wherein the atmospheric shielding type analysis device further comprises a sealing member interposed between the second support member and the second through hole.

13. The atmospheric shielding type analysis device according to claim 1, wherein
   the first substrate has one surface connected to one end of the first conductive wire member,
   the first mounting member further comprises a first current collecting member disposed on another surface of the first substrate,
   the first current collecting member has the same or smaller area than the first substrate and allows current and electrons to move between the first conductive wire member and the battery cell, and the first current collecting member is brought into contact with the battery cell.

14. The atmospheric shielding type analysis device according to claim 1, wherein the second mounting member comprises:
a disk plate having a predetermined area and thickness and having one surface connected to the second conductive wire member;
the second substrate disposed on another surface of the disk plate;
an elastic member interposed between the disk plate and the second substrate to elastically support the second substrate; and
a second current collecting member disposed on another surface of the second substrate and having the same or smaller area than the second substrate so as to allow current and electrons to move between the second conductive wire member and the battery cell.

15. The atmospheric shielding type analysis device according to claim 1, wherein the second mounting member comprises:
a load cell connected with the second conductive wire member by screw threads;
the second substrate connected to the load cell;
an elastic member provided interposed the load cell and the second substrate to elastically support the second substrate; and
a second current collecting member disposed on another surface of the second substrate and having the same or smaller area than the second substrate so as to allow current and electrons to move between the second conductive wire member and the battery cell, and
wherein the second mounting member adjusts the load applied to the battery cell by regulating the screw threads of the second conductive wire member and the load cell.

16. The atmospheric shielding type analysis device according to claim 1, wherein the second mounting portion comprises:
a disk plate having a predetermined area and thickness and having one surface connected to the second conductive wire member;
the second substrate disposed on another surface of the disk plate;
a ball member protruding from another surface of the disk plate so as to locally press the second substrate;
an elastic member interposed between the disk plate and the second substrate to elastically support the second substrate; and
a second current collecting member located on another surface of the second substrate and having the same or smaller area than the second substrate so as to allow current and electrons to move between the second conductive wire member and the battery cell.

17. The atmospheric shielding type analysis device according to claim 1, wherein the gas inlet and the gas outlet are on opposite side walls of the body member.

18. The atmospheric shielding type analysis device according to claim 1, wherein the first substrate and the second substrate each have a predetermined area.

19. A method of analyzing a cross section of a battery cell using the atmospheric shielding type analysis device of claim 1, comprising:
loading the battery cell comprising a positive electrode layer, an electrolyte layer, and a negative electrode layer which are stacked in this order between the first mounting member and the second mounting member with the cross section of the battery cell facing the cover member;
allowing gas introduced into the inner space through the gas inlet to be discharged through the gas outlet so as to create a flow of gas;
supplying a current to the battery cell through the first conductive wire member and the second conductive wire member to charge and discharge the battery cell; and
analyzing the cross section of the battery cell using an analyzer located above the cover member.

20. The method according to claim 19, wherein the method further comprising adjusting a degree of insertion of the second conductive wire member to adjust a pressure applied to the battery cell to a desired level, then charging and discharging the battery cell.

* * * * *